(12) United States Patent
Charkin et al.

(10) Patent No.: US 9,559,518 B2
(45) Date of Patent: Jan. 31, 2017

(54) SYSTEM AND METHOD OF SOLAR MODULE BIASING

(71) Applicant: FIRST SOLAR, INC, Perrysburg, OH (US)

(72) Inventors: Ivan Charkin, Toledo, OH (US); Kevin V. Crots, Perrysburg, OH (US)

(73) Assignee: FIRST SOLAR, INC., Perrysburg, OH (US)

( * ) Notice: Subject to any disclaimer, the term of this patent is extended or adjusted under 35 U.S.C. 154(b) by 870 days.

(21) Appl. No.: 13/873,816

(22) Filed: Apr. 30, 2013

(65) Prior Publication Data

US 2013/0313900 A1 Nov. 28, 2013

Related U.S. Application Data

(60) Provisional application No. 61/641,025, filed on May 1, 2012.

(51) Int. Cl.
*H02J 1/00* (2006.01)
*H02J 3/38* (2006.01)

(52) U.S. Cl.
CPC .................. *H02J 1/00* (2013.01); *H02J 3/383* (2013.01); *Y02E 10/563* (2013.01); *Y10T 307/305* (2015.04)

(58) Field of Classification Search
CPC ......... H02J 3/383; H02J 1/00; Y10T 307/305; Y02E 10/563
USPC .......................................................... 307/52
See application file for complete search history.

(56) References Cited

U.S. PATENT DOCUMENTS

| 4,166,918 | A |   | 9/1979 | Nostrand et al. |
|---|---|---|---|---|
| 4,494,302 | A | * | 1/1985 | Knechtli ............. H01L 21/3245 136/246 |
| 5,215,599 | A |   | 6/1993 | Hingorani et al. |
| 6,081,017 | A |   | 6/2000 | Kim et al. |
| 6,246,219 | B1 | * | 6/2001 | Lynch ....................... G05F 1/67 320/101 |
| 6,365,825 | B1 | * | 4/2002 | Hayashi ................ H01L 31/186 136/243 |
| 6,979,771 | B2 | * | 12/2005 | Mimura ................ H01L 31/044 136/244 |

(Continued)

FOREIGN PATENT DOCUMENTS

| GB | 2476508 A | 6/2011 |
|---|---|---|
| KR | 10-2009-0128954 A | 12/2009 |

OTHER PUBLICATIONS

K. Emery et al., "Measurement of Photovoltaic Device Current as a Function of Voltage, Termperature, Intensity and Spectrum." Solar Cells, vol. 21, pp. 313-327, 1987.

(Continued)

*Primary Examiner* — Jared Fureman
*Assistant Examiner* — Michael Warmflash
(74) *Attorney, Agent, or Firm* — Blank Rome LLP

(57) ABSTRACT

A system and method for biasing one or more arrays of photovoltaic modules. An array of biasing photovoltaic modules is coupled to an array of photovoltaic modules to be biased. The coupling may be via a current regulating device. The array of biasing photovoltaic modules and current regulating device provide a forward bias current to the array of photovoltaic modules to be biased. The array of biasing photovoltaic modules includes more photovoltaic modules than the array of photovoltaic modules to be biased.

30 Claims, 6 Drawing Sheets

(56) References Cited

U.S. PATENT DOCUMENTS

| | | | |
|---|---|---|---|
| 7,276,684 B2 | 10/2007 | Misek | |
| 7,969,757 B2* | 6/2011 | Kernahan | H01L 31/02021 136/293 |
| 7,979,969 B2* | 7/2011 | Basol | H01L 31/03928 29/402.03 |
| 8,633,671 B2* | 1/2014 | Kelly | H01M 10/465 136/244 |
| 8,659,858 B2* | 2/2014 | Matsuo | H02S 50/10 361/42 |
| 9,184,594 B2* | 11/2015 | Garabandic | H02J 3/383 |
| 2001/0023703 A1* | 9/2001 | Kondo | H01L 31/02021 136/244 |
| 2003/0015728 A1 | 1/2003 | Bosco et al. | |
| 2010/0084011 A1 | 4/2010 | Forrest et al. | |
| 2010/0109759 A1 | 5/2010 | Ochi et al. | |
| 2011/0012430 A1* | 1/2011 | Cheng | H01L 31/02021 307/82 |
| 2011/0121647 A1* | 5/2011 | Ragavanis | H02J 1/06 307/19 |
| 2011/0203635 A1* | 8/2011 | Beck | H01L 31/02021 136/244 |
| 2011/0276188 A1* | 11/2011 | Beck | H02J 7/35 700/287 |
| 2012/0112557 A1* | 5/2012 | Sager | H01L 31/02021 307/112 |
| 2012/0280571 A1* | 11/2012 | Hargis | G05F 1/67 307/77 |
| 2012/0313455 A1* | 12/2012 | Latham | H01L 31/02021 307/117 |
| 2013/0057198 A1* | 3/2013 | Gerlovin | H02J 7/0019 320/103 |
| 2013/0241294 A1* | 9/2013 | Cleland | H02J 3/383 307/71 |
| 2013/0249297 A1* | 9/2013 | Takehara | H02J 1/00 307/71 |
| 2015/0308889 A1* | 10/2015 | Stueve | G01J 1/32 250/252.1 |

OTHER PUBLICATIONS

C. Honsberg et al., "Bias of PN Junctions." http://pveducation.org./pvcdrom/pn-junction/bias-of-pn-junction. Oct. 27, 2011.

Y. Yuan et al., "Efficiency Enhancement in Organic Solar Cells with Ferroelectric Polymers." Nature Materials, vol. 10, pp. 296-302, Apr. 2011. Supplementary Information, pp. 1-12.

B. Van Zeghbroeck, "Principles of Semiconductor Device." http://ecee.colorado.edu/~bart/book/book/chapter4/ch4_6.htm.

* cited by examiner

US 9,559,518 B2

SYSTEM AND METHOD OF SOLAR MODULE BIASING

FIELD OF THE INVENTION

The disclosed embodiments relate to photovoltaic (PV) devices, such as PV cells and PV modules containing a plurality of PV cells, and methods of improving the efficiency of the same while in the field.

BACKGROUND OF THE INVENTION

PV devices convert sunlight into electricity via a physical process called "photovoltaic effect." Specifically, sunlight is composed of photons, or "packets" of energy. The photons contain various amounts of energy corresponding to different wavelengths of light. Upon striking a PV device, a photon may be reflected, absorbed, or pass right through the device. When a photon is absorbed, the energy of the photon is converted into electrical energy by a semiconductor within the PV device. This electrical energy is transferred to two separate electrodes. The PV device can then be used to power an external electrical load using the two electrodes.

Current-biasing may be used to make a PV device more efficient. A method of improving PV device efficiency by biasing or re-biasing the device may be used in the field.

DETAILED DESCRIPTION OF THE INVENTION

In the following detailed description, reference is made to the accompanying drawings, which form a part hereof, and in which is shown by way of illustration specific embodiments that may be practiced. It should be understood that like reference numbers represent like elements throughout the drawings. Embodiments are described with sufficient detail to enable those skilled in the art to practice them. It is to be understood that other embodiments may be employed, and that various structural, logical, and electrical changes may be made without departing from the spirit or scope of the invention.

Disclosed herein are systems and methods for improving the efficiency of PV devices in the field. A PV device may be either a PV module or an individual PV cell. A PV module includes a plurality of PV cells connected in series and/or parallel configurations, depending on the desired current and voltage output from the module. In practice, the disclosed systems and methods are applied to PV modules and not to individual PV cells within a module. However, the disclosed systems and methods may also be applied to individual or standalone PV cells that are not integrated into a module.

Figure 1:
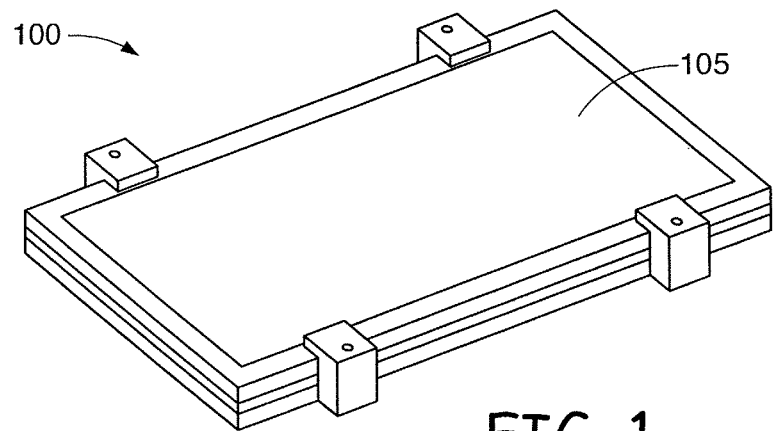
FIG. 1 illustrates a top perspective view of a photovoltaic module.
Figure 2:
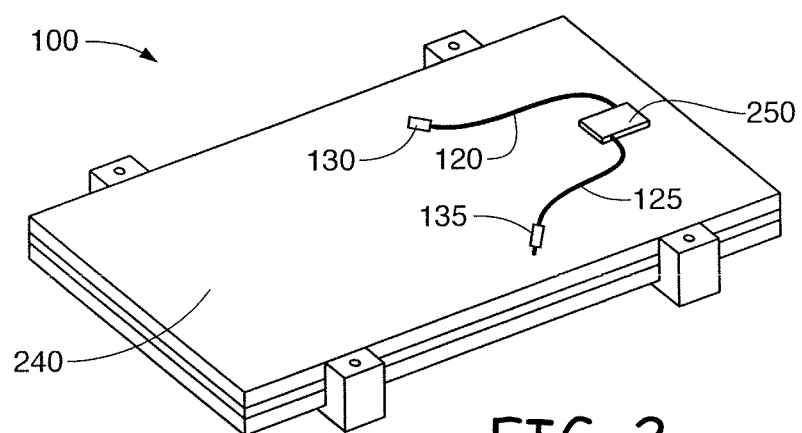
FIG. 2 illustrates a bottom perspective view of a photovoltaic module.

A PV module generally includes multiple material layers formed on a substrate. FIG. 1 shows a top perspective view of an exemplary photovoltaic module 100, and FIG. 2 shows a bottom perspective view of the same module. The module 100 is configured to receive sunlight on its top surface and may include an anti-reflective coating 105 to increase light transmission. The module 100 may have any suitable geometry. In one example, the module may be a thin-film cadmium telluride solar module. As shown in FIG. 2, the exemplary module may include a junction box 250 for electrically connecting the module to other modules or electrical devices using a pair of cables 120, 125. The cables 120, 125 provide an electrical connection to the electrodes of the PV cells within the module 100. For example, if the PV cells within the module 100 are arranged in series, one of the cables 120, 125 is connected via junction box 250 to the PV cell at one end of the series while the other of the cables 120, 125 is connected via junction box 250 to the PV cell at the other end of the series. The ends of the cables 120, 125 may be fitted with quick connects 130, 135 in order to speed the PV module installation process. The junction box 250 may be mounted on a back cover 240 of the module 100.

Figure 3:
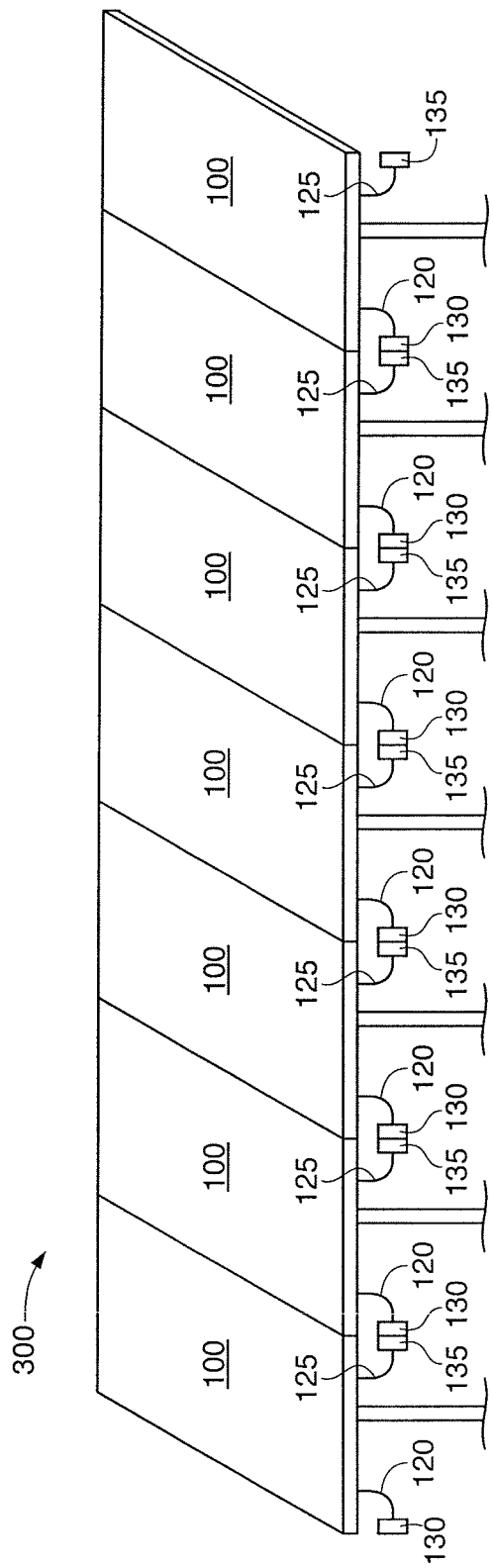
FIG. 3 illustrates an array of photovoltaic modules.

In the field, a module 100 is often connected to other modules 100 to create an array of PV modules. For example, FIG. 3 illustrates an array 300 of PV modules 100. The PV modules 100 in the array 300 are connected in series using the cables 120, 125 and quick connects 130, 135. A solar farm, for example, includes many PV arrays, each configured to generate electrical power and then deliver the power to a load coupled to the solar farm (for example, a utility grid). The solar farm typically includes inverters, converters, power substations and other power plant components, all configured to condition and deliver the generated power to the coupled loads.

The PV modules in the solar farm arrays are easily connected and disconnected from the arrays, due to the quick connects 130, 135. However, the modules 100 are not easily mobile. The modules 100 may be large, bulky and anchored onto a support foundation for use in the solar farm. Therefore, maintenance of the PV modules is preferably performed on-site.

One type of maintenance that is preferably performed on-site is the biasing of the PV modules 100. Instead of transporting the modules back to a manufacturing plant for biasing and re-biasing, a method and system of biasing can be applied at the solar farm.

The below-described method and system of biasing can be applied to PV modules either immediately upon installation or at any time during their lifetime.

Figure 4:
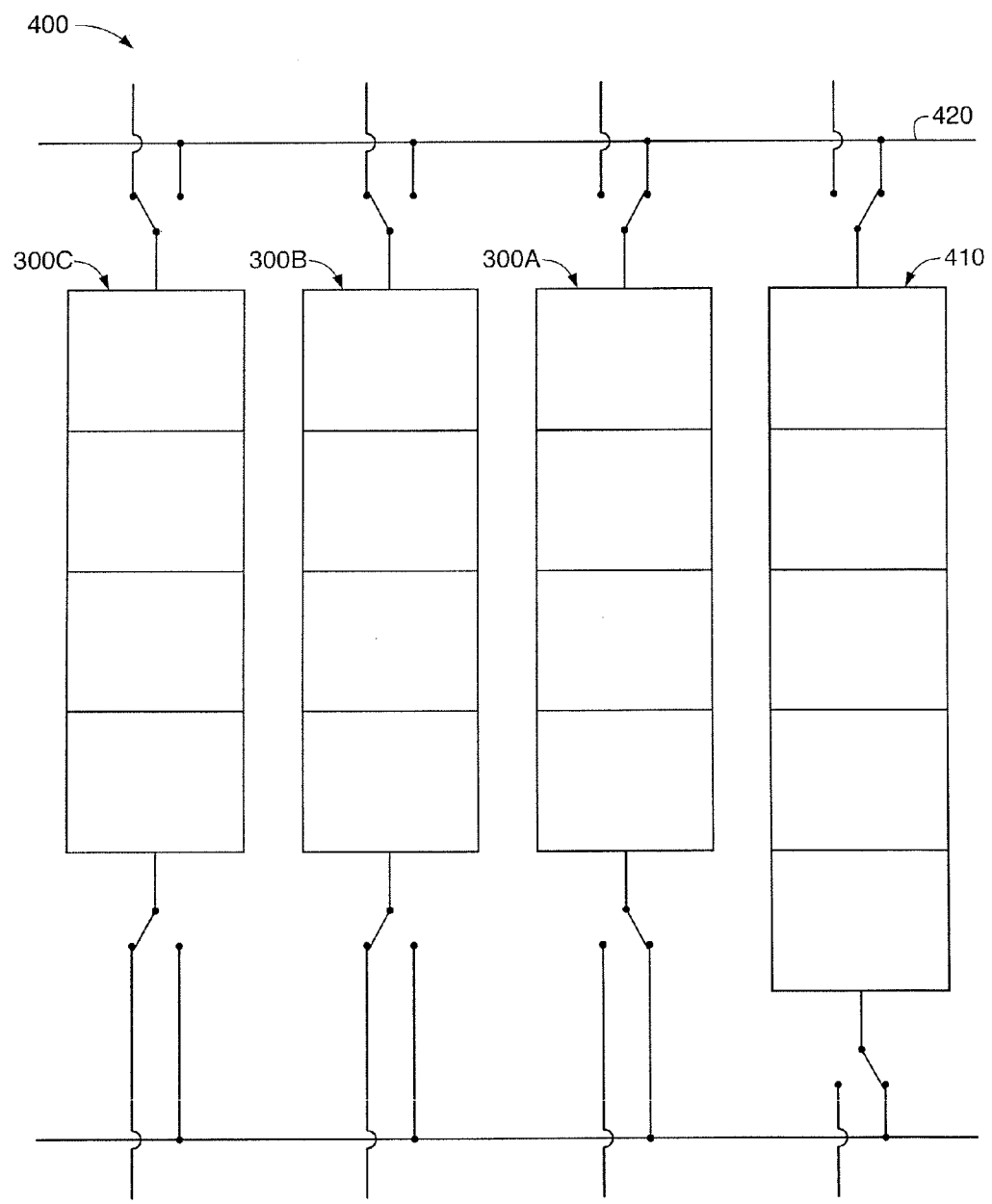
FIG. 4 illustrates a biasing system in accordance with the present disclosure.

In order to re-bias PV modules 100 while in the field, an array of biasing modules 410 is provided, as illustrated in the biasing system 400 of FIG. 4. In the biasing system 400, a plurality of PV module arrays 300A, 300B, 300C (collectively, 300) are arranged for generating electrical power at, for example, a solar power plant. The PV module arrays 300 each include an integer number n of PV modules 100. Alternatively, the PV module arrays 300 can easily be reconfigured to include an integer number n of PV modules 100 by either connecting or disconnecting the modules 100 using the module quick connects.

In addition, the biasing system 400 includes at least one array of biasing modules 410. The array of biasing modules 410 includes at least n+1 modules. As explained below, the array of biasing modules 410 must include more modules than at least one of the array 300 of PV modules to be biased so as to provide sufficient overhead voltage to sustain the necessary current loading. The biasing modules 410 may be the same as or similar to the modules 100, meaning that each biasing module 410 is a PV module that generates electricity. The array of biasing modules 410 can be connected to an array 300 of PV modules 100, as described below, in order to bias the array 300 of PV modules 100. Connections may be adjusted so that the array of biasing modules 410 is first connected to a first array 300A of PV modules 100 and then to other arrays 300B, 300C of PV modules 100. The ability to change which PV module array is being biased by the biasing modules 410 can be implemented through manual connections (using, for example, the ability to quickly disconnect and connect the quick connects 130, 135) or through a switch network 420. When not being used to bias other modules, biasing modules 410 can be used to generate electricity just as PV modules 100 are used.

Thus, in FIG. 4, the array of biasing modules 410 is coupled to a first array 300A of PV modules via switch network 420 in order to bias the first array 300A of PV modules. Accordingly, the array of biasing modules 410 and the first array 300A of PV modules are disconnected from the local solar power plant grid, while other arrays 300B, 300C of PV modules remain connected to the local grid in order to continue to provide electricity for the solar power plant. When the below-described biasing process is completed, the array of biasing modules 410 is decoupled from the first array 300A of PV modules and either coupled to a second array of PV modules (which would be decoupled from the local grid), coupled to the local solar power plant grid in order to generate electricity for the power plant, or, if the array 410 itself or portions thereof require biasing, the array 410 is coupled to other modules that will apply a bias operation to the array 410 or portions thereof.

Figure 5:
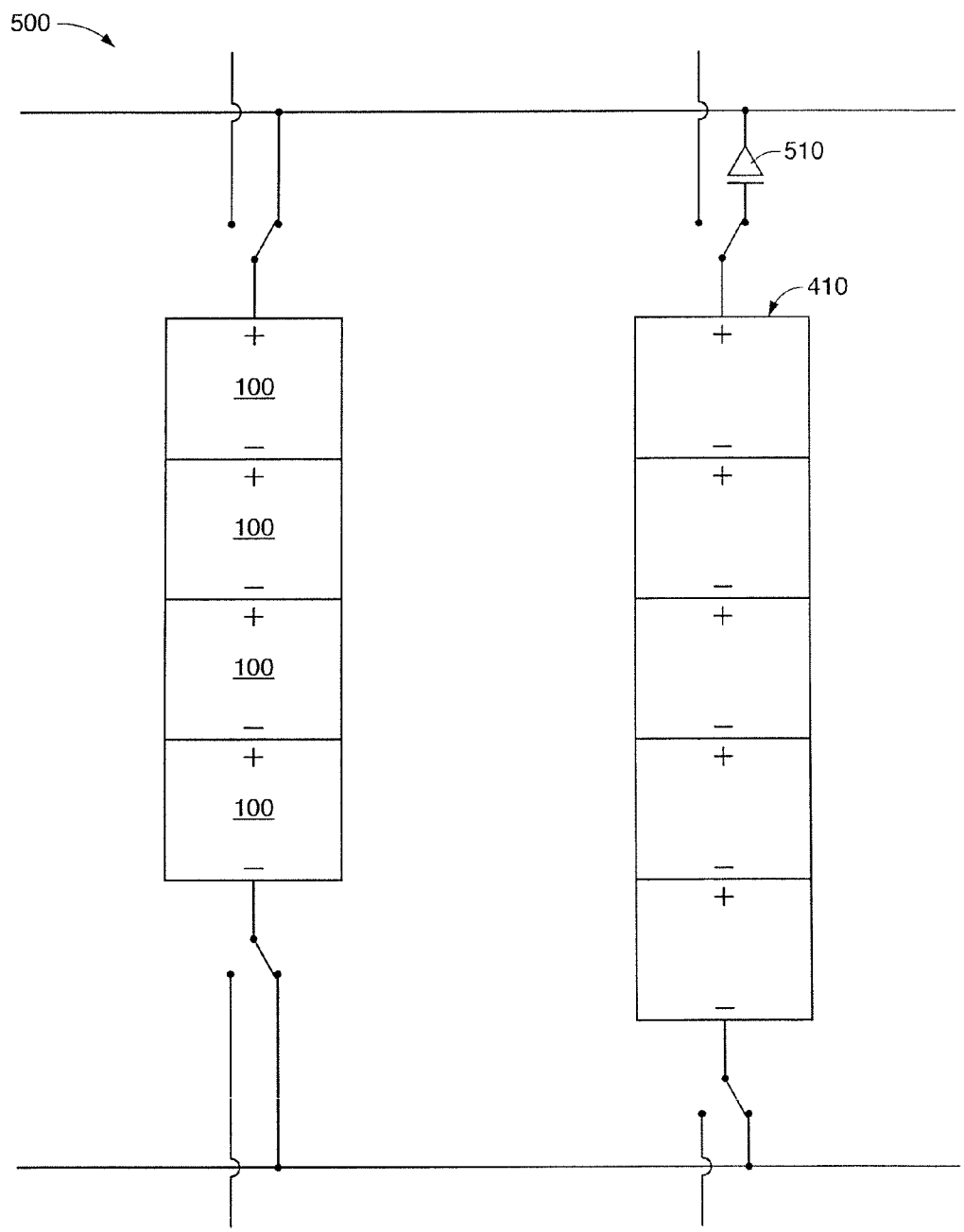
FIG. 5 illustrates a biasing system in accordance with the present disclosure.
Figure 6:
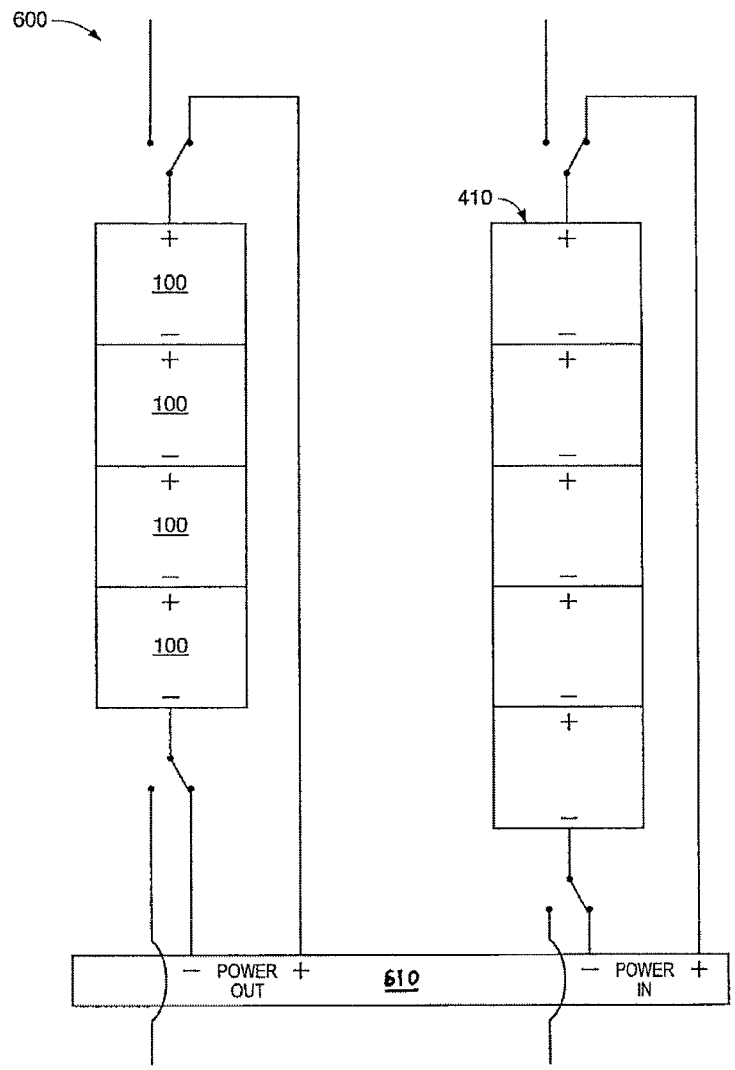
FIG. 6 illustrates a biasing system in accordance with the present disclosure.

While FIG. 4 illustrates the switch network 420 that is used to couple arrays 410 and arrays 300 to each other or to the local power plant grid, additional components are necessary in order to ensure proper current flow from the biasing array 410 to the PV module array 300. For sake of clarity, these additional components are not shown in FIG. 4. However, these additional components are illustrated in FIGS. 5 and 6, described below. Thus, the switch network 420 of FIG. 4 is modified according to the systems illustrated in either FIG. 5 or FIG. 6.

FIG. 5 illustrates a system 500 for using the biasing modules 410 to bias the PV modules 100. System 500 demonstrates an unregulated biasing strategy. In system 500, an array of biasing modules 410 is provided in series in order to produce a static output of known current and voltage. When connected to an array of PV modules 100, the array of biasing modules 410 is configured to provide a forwarding bias current to the array of PV modules 100 in order to bias the modules. The array of biasing modules 410 includes at least n+1 biasing modules, or at least one more biasing modules than the PV modules to be biased. The at least one extra module ensures that enough overhead voltage is provided to sustain the necessary current loading required by the array of PV modules 100. In the system 500, a directional current device 510 such as one or more diodes couples the array of biasing modules 410 to the PV modules 100. The directional current device 510 ensures that no back current flows and that the current provided moves from the biasing modules 410 to the PV modules 100.

System 500 includes no additional components for controlling the current delivered to the PV modules 100. Thus, system 500 is referred to as an "unregulated" system. While a constant current output is preferred for the biasing operation, the unregulated system 500 cannot guarantee a constant current. For example, the output of biasing modules 410 may be affected by changes in the weather (e.g., a cloud momentarily obscures the sun) or other conditions. Thus, while system 500 can result in a biased array due to an applied current, the current is not guaranteed to be constant. The unregulated system 500 is in contrast to the regulated system 600 illustrated in FIG. 6.

FIG. 6 illustrates the system 600 for using the biasing modules 410 to bias the PV modules 100. System 600 uses a regulated biasing strategy. In system 600, the biasing modules 410 are again provided in series in order to produce a current and voltage output. However, instead of coupling the output current to the PV modules 100 through a directional current device, the output of the array of biasing modules 410 is instead coupled to a current regulator 610. The current regulator 610 conditions the input current so that a known output current can be output. The known output current can be changed using the current regulator 610, if desired.

In system 600, as in the unregulated system 500, a forwarding bias current is provided to the array of PV modules 100. In system 600, the bias current is provided from the current regulator 610. While the current regulator 610 controls the current output to the PV modules 100, the current regulator 610 allows its output voltage to fluctuate according to the demands of the PV modules 100. Thus, in the regulated system 600, a desired constant current is provided while voltage varies based on, for example, the resistance of the PV modules 100. Because the currents provided (and accompanying voltages) are relatively small, the current regulator 610 may be designed as a small and even portable device.

In systems 500, 600, the biasing modules 410 may be a subset of PV modules 100. In other words, a solar power plant, for example, that includes PV modules 100 can include a dedicated subset of PV modules 100 serving as biasing modules 410 as needed. When not needed, the biasing modules 410 generate electricity to contribute to the output of the solar farm. When needed to bias other PV modules, the biasing modules 410 and the PV modules 100 to be biased are disconnected from the solar farm grid and the biasing modules 410 are coupled to the PV modules 100 using either system 500 or system 600. Alternatively, the biasing modules 410 need not be limited to a dedicated subset; any PV module 100 can serve as a biasing module 410 when needed. As an example, an array of at least n+1 PV modules 100 can act as biasing modules 410 for an array of n PV modules 100 in need of a bias. Subsequently, at least some of the PV modules 100 that were biased may be used as biasing modules 410 for other PV modules 100 in need of a bias (including the PV modules originally used as biasing modules). When the PV modules 100 are acting as biasing modules 410, the biasing modules 410 are coupled to an array of PV modules 100 to be biased using either a directional current device 510 (in the unregulated system 500) or a current regulator 610 (in the regulated system 600). In each system, the subset of PV modules used during any given biasing operation must include at least one more biasing module than the number of PV modules being biased during the biasing operation.

Figure 7:
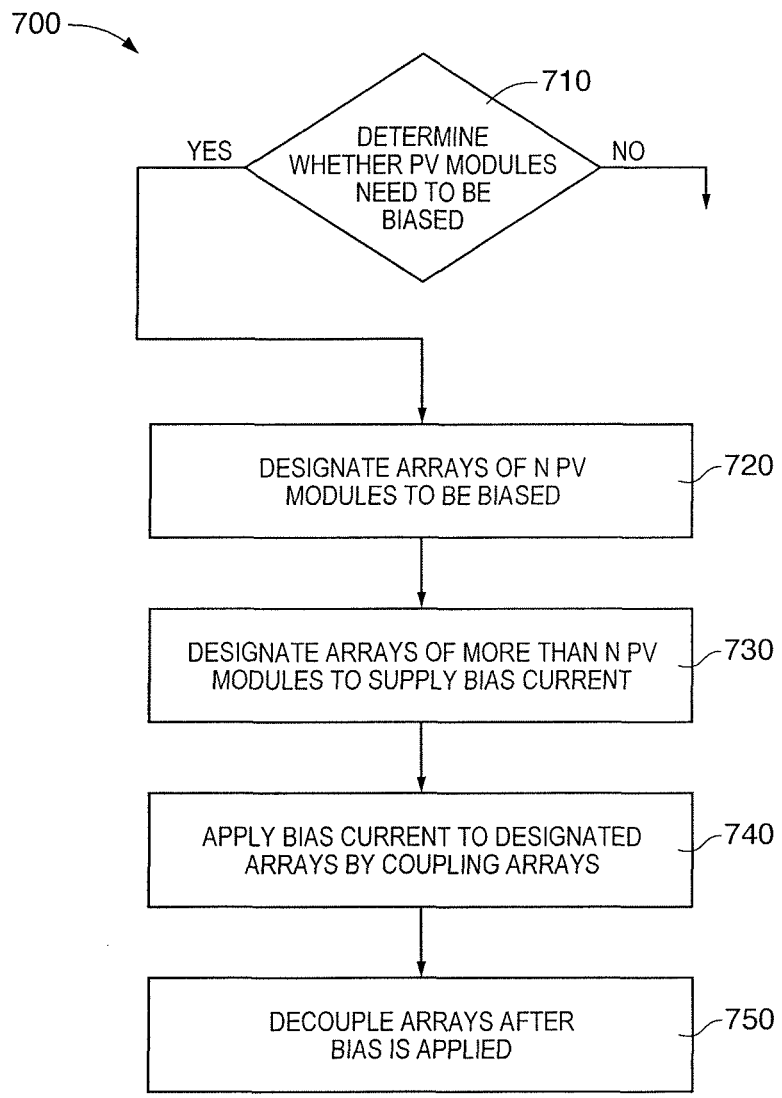
FIG. 7 illustrates a method of using a biasing system in accordance with the present disclosure.

FIG. 7 illustrates a method 700 for using PV modules to bias other PV modules in the field. In method 700, a determination is made (at step 710) that one or more PV modules need to be biased.

At step 720, an integer number n of PV modules is designated for biasing based on the determination made during step 710. At step 730, an integer number of at least n+1 PV modules is designated as biasing modules to be used to bias the n PV modules designated in step 720. At step 730, the biasing modules are serially coupled to each other and their output is directed to the n PV modules to be biased. The biasing module output is directed to the PV modules to be biased via a current regulating device such as either a directional current device or a current regulator. The current regulating device assists in providing a biasing current to the PV modules.

At step 740, the biasing modules are used to bias the n PV modules. The process of biasing the n PV modules may take several minutes or even hours, with the biasing time being generally related to the module temperature. The biasing process results in a forward bias constant current being applied from the biasing modules to the PV modules.

When the biasing process is completed (e.g., the necessary time has elapsed), the biasing modules are disconnected from the biased PV modules (step 750). The biasing modules may then be used to bias additional PV modules, to be biased themselves (if needed), or to generate electricity for the solar farm output.

The above-described biasing process is especially useful when PV modules are pre-assembled into arrays of known size. For example, a solar farm may include pre-assembled arrays of PV modules, with the pre-assembled arrays including arrays of length n and arrays of length at least n+1. Such pre-assembled arrays may be assembled on cartridges. An example of an array assembled on a cartridge can be found in U.S. Patent Application Publication No. 2011/0140528 (U.S. patent Ser. No. 12/969,049), the disclosure of which is incorporated herein by reference. Thus, a cartridge that includes more PV modules than another cartridge can be used to bias the smaller cartridge with a minimal amount of disconnecting and reconnecting of PV modules into arrays.

Additionally, although the biasing modules 410 have been described above as being serially connected, other configurations may be used. For example, the biasing modules 410 could be connected in parallel. Regardless of the configuration used, however, the output of the biasing modules 410 must provide a sufficient bias current, and preferably a constant current. Some configurations may require additional components to provide a biasing module output current that is a constant current.

The above description and drawings are only to be considered illustrative of specific embodiments, which achieve the features and advantages described herein. Modifications and substitutions to specific process conditions can be made. Accordingly, the embodiments of the invention are not considered as being limited by the foregoing description and drawings, but is only limited by the scope of the appended claims.

What is claimed as new and desired to be protected by Letters Patent of the United States is:

1. A system for biasing photovoltaic modules, comprising:
   a first array of photovoltaic modules to be biased;
   an array of biasing photovoltaic modules, wherein the array of biasing photovoltaic modules includes at least one more photovoltaic module than the first array of photovoltaic modules; and
   a current regulating device that couples a current output from the array of biasing photovoltaic modules to the first array of photovoltaic modules.

2. The system of claim 1, wherein the current regulating device is a directional current device.

3. The system of claim 1, wherein the current regulating device is a current regulator that outputs a constant current but allows an output voltage to vary.

4. The system of claim 3, wherein the current regulator is portable.

5. The system of claim 1, wherein the array of biasing photovoltaic modules is connected to generate solar power when not being connected to bias the first array of photovoltaic modules.

6. The system of claim 1, wherein the biasing photovoltaic modules in the array of biasing photovoltaic modules are serially connected.

7. The system of claim 1, further comprising a second array of photovoltaic modules to be biased.

8. The system of claim 7, further comprising a switch network to configure the array of biasing photovoltaic modules to couple to either the first or the second array of photovoltaic modules.

9. A solar power plant, comprising:
   a plurality of arrays of photovoltaic modules;
   a first subset of arrays of the plurality of arrays of photovoltaic modules, wherein the first subset of arrays includes one or more arrays of photovoltaic modules that are to be biased;
   a second subset of arrays of the plurality of arrays of photovoltaic modules, wherein the second subset of arrays includes one or more arrays of biasing photovoltaic modules that are to be used to bias at least one of the first subset of arrays, wherein the arrays of the second subset of arrays each include at least one more photovoltaic module than at least one array of the first subset of arrays; and
   a plurality of current regulating devices, each device configured to couple an array from the second subset of arrays to an array in the first subset of arrays, wherein the coupled array from the first subset of arrays has fewer photovoltaic modules than the coupled array from the second subset of arrays.

10. The solar power plant of claim 9, wherein at least some of the plurality of current regulating devices are directional current devices.

11. The solar power plant of claim 9, wherein at least some of the plurality of current regulating device are current regulators that each output a constant current but allow an output voltage to vary.

12. The solar power plant of claim 11, wherein the current regulators are portable.

13. The solar power plant of claim 9, wherein arrays in the second subset of arrays are connected to generate solar power when not being connected to bias arrays in the first subset of arrays.

14. The solar power plant of claim 9, wherein the arrays in the second subset of arrays are serially connected.

15. The solar power plant of claim 9, further comprising a switch network to selectively couple the second subset of arrays to the first subset of arrays.

16. A method of biasing an array of photovoltaic modules, the method comprising:
   designating a first array of photovoltaic modules to be biased;
   designating a second array of photovoltaic modules to be used to bias the first array, where the second array includes more photovoltaic modules than the first array;
   coupling the second array to the first array via a current regulating device; and
   using the second array and current regulating device to provide a forward bias current to the first array.

17. The method of claim 16, wherein the current regulating device is a directional current device.

18. The method of claim 16, wherein the current regulating device is a current regulator that provides constant forwarding bias current but allows an output voltage to vary.

19. The method of claim 18, wherein the current regulator is portable.

20. The method of claim 16, further comprising using the second array to generate solar power when not being used to bias the first array.

21. The method of claim 16, wherein the photovoltaic modules in the second array are serially connected.

22. The method of claim 16, further comprising using the second array and current regulating device to provide a forward bias constant current to a third array of photovoltaic modules to be biased.

23. The method of claim 22, further comprising using a switch network to configure the second array to couple to either the first or the third arrays via the current regulating device.

24. A method of biasing one or more arrays of a plurality of arrays of photovoltaic modules, the method comprising:
designating a first subset of arrays of the plurality of arrays, wherein the first subset of arrays include arrays of photovoltaic modules to be biased;
designating a second subset of arrays of the plurality of arrays of photovoltaic modules, wherein the second subset of arrays are to be used to bias arrays in the first subset of arrays, and wherein the arrays of the second subset of arrays each include at least one more photovoltaic module than at least one array of the first subset of arrays;
coupling arrays of the second subset of arrays to arrays of the first subset of arrays via current regulating devices, wherein for each pair of coupled arrays, the array from the first subset of arrays has fewer photovoltaic modules than the array from the second subset of arrays; and
using the coupled second arrays and current regulating devices to provide forward bias currents to the coupled first arrays.

25. The method of claim 24, wherein the current regulating devices include directional current devices.

26. The method of claim 24, wherein the current regulating devices include current regulators that provide constant forwarding bias currents but allow output voltages to vary.

27. The method of claim 26, wherein the current regulators are portable.

28. The method of claim 24, further comprising using arrays from the second subset of arrays to generate solar power when not being used to bias arrays in the first subset of arrays.

29. The method of claim 24, wherein the photovoltaic modules in the arrays of the second subset of arrays are serially connected.

30. The method of claim 24, further comprising using a switch network to selectively couple the second subset of arrays to the first subset of arrays.

* * * * *